United States Patent Office 3,420,285
Patented Jan. 7, 1969

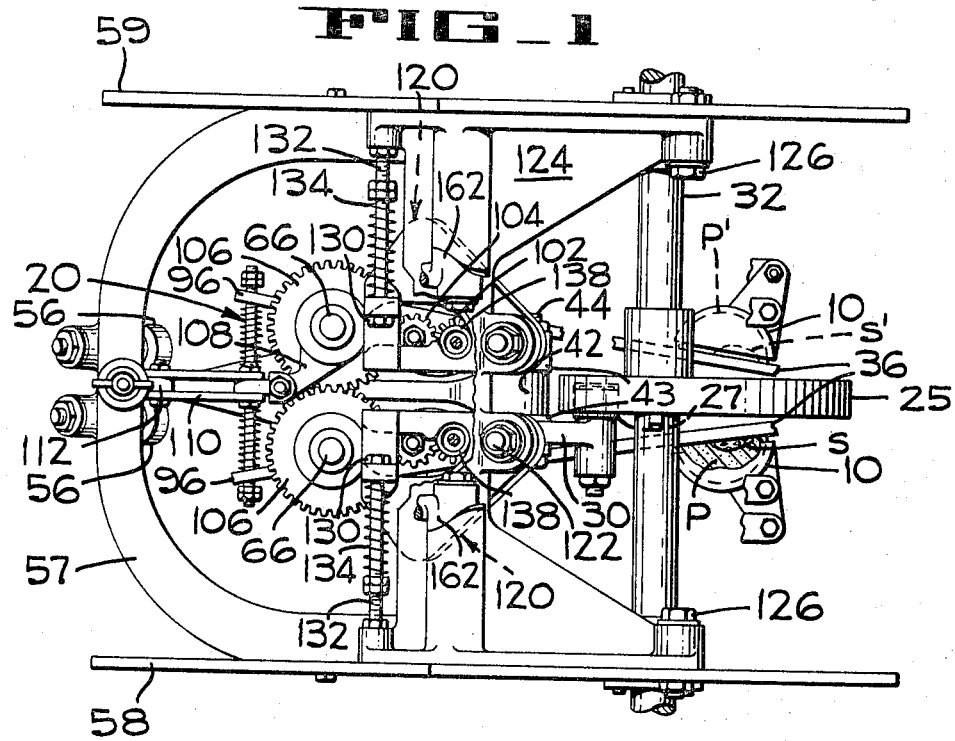
FIG_1
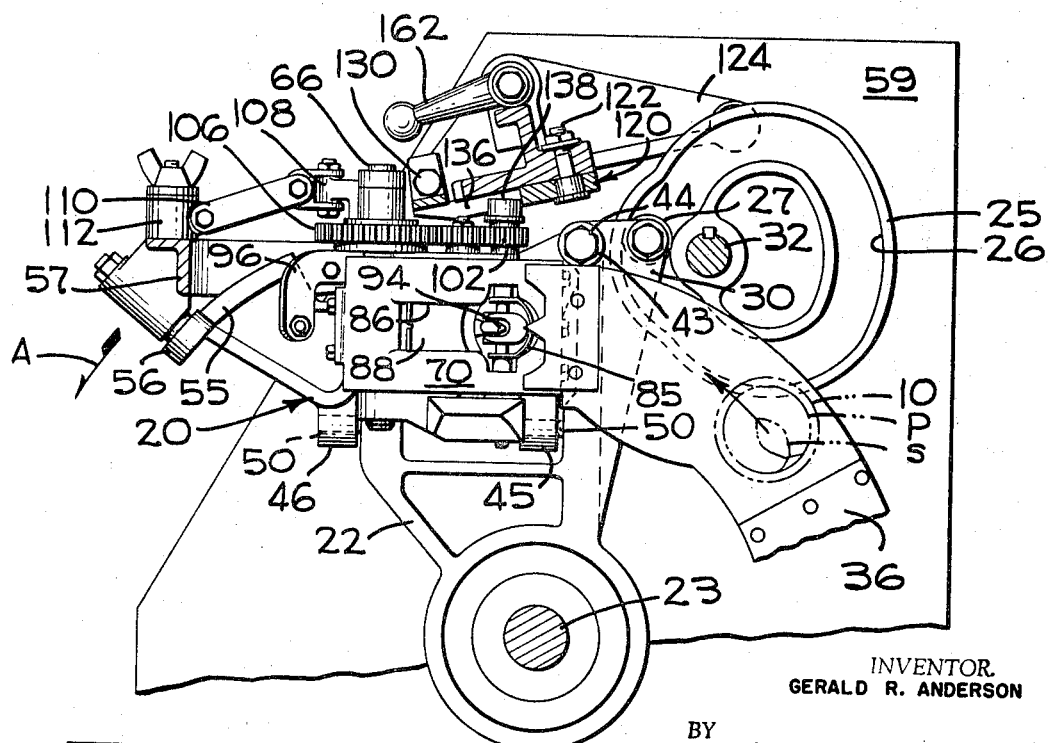
FIG_2

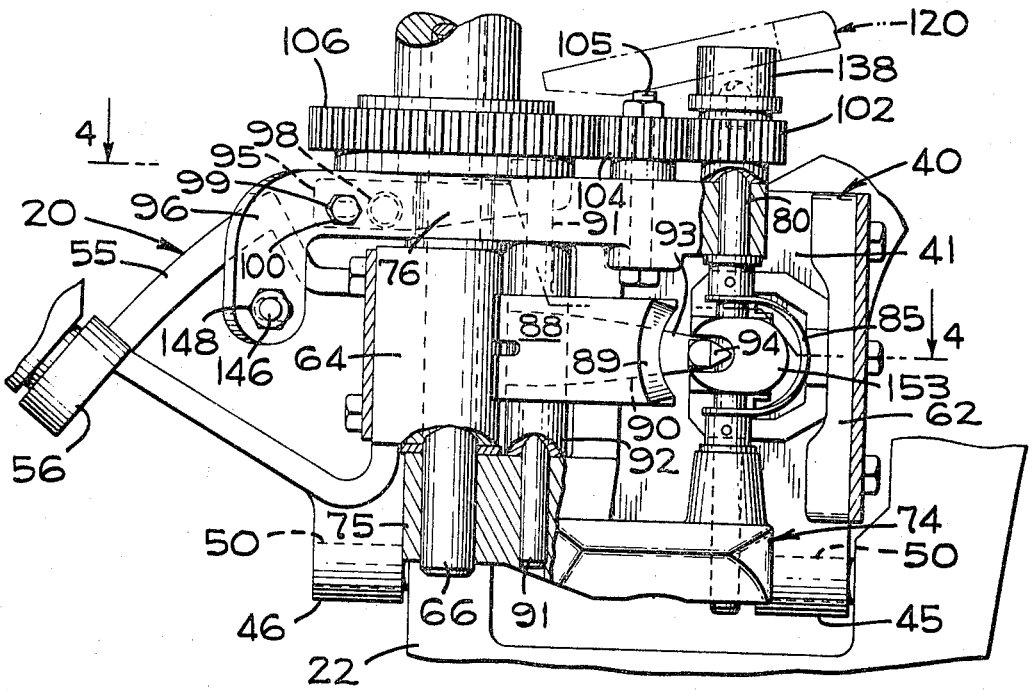
FIG_3
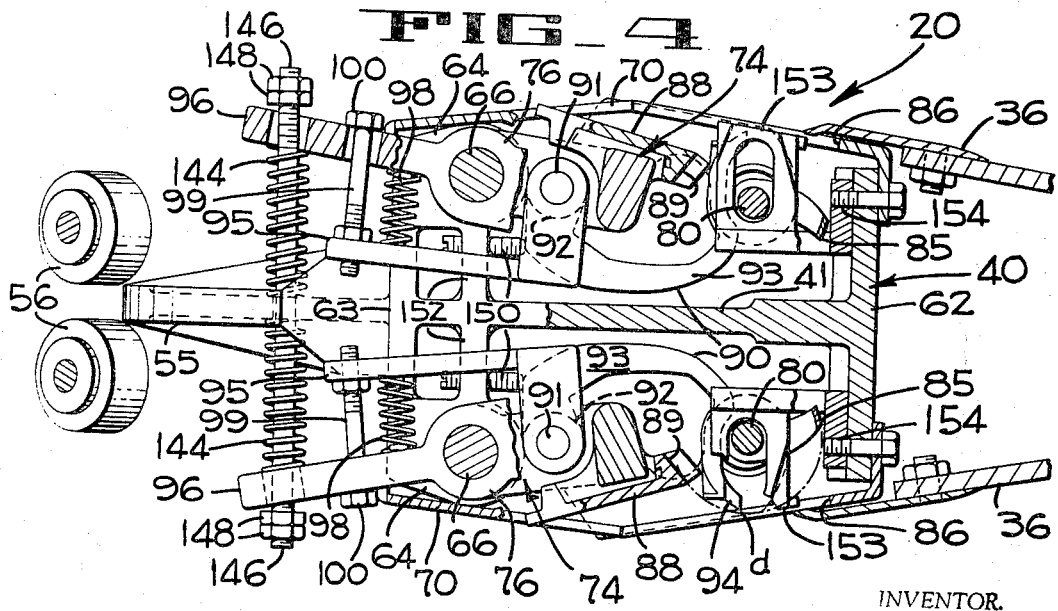
FIG_4

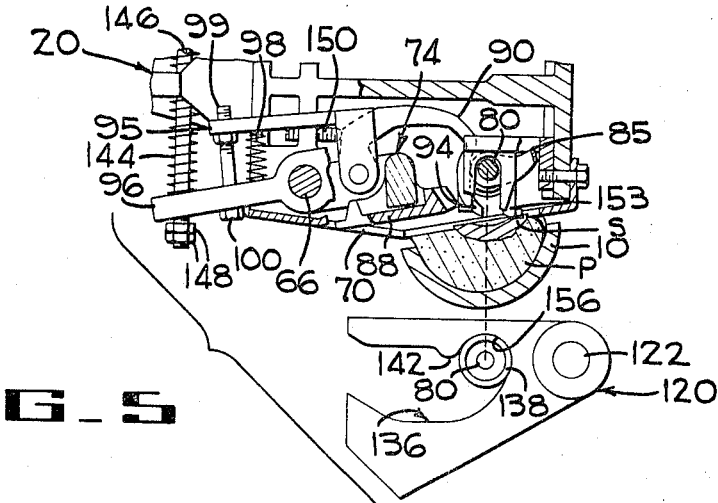
FIG_5
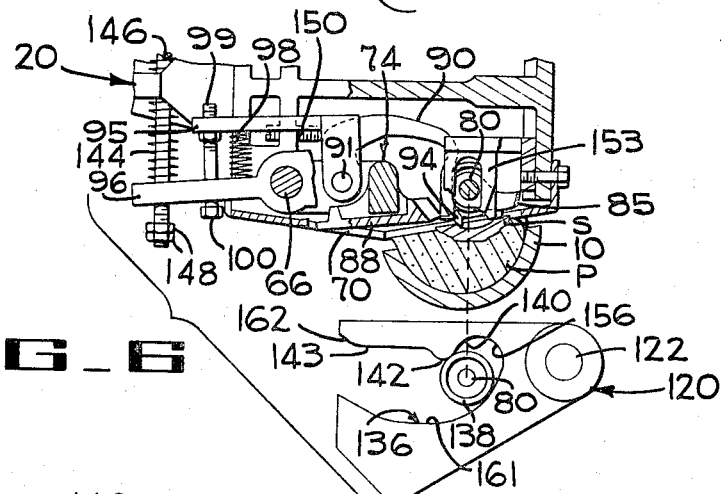
FIG_6
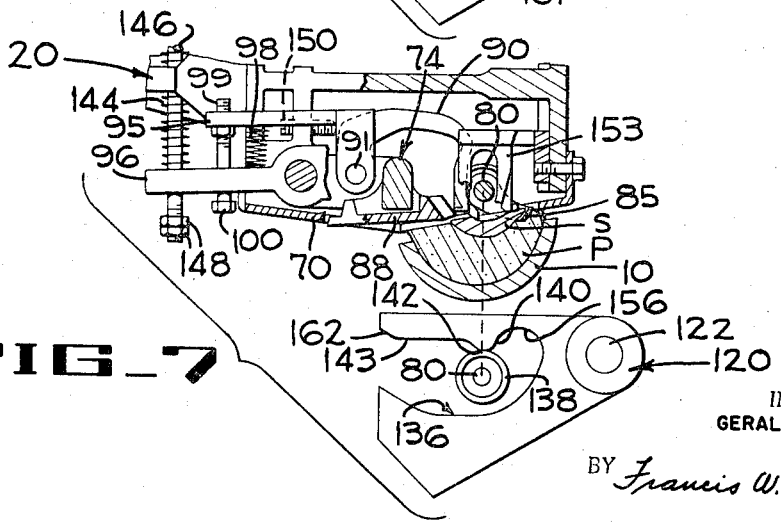
FIG_7

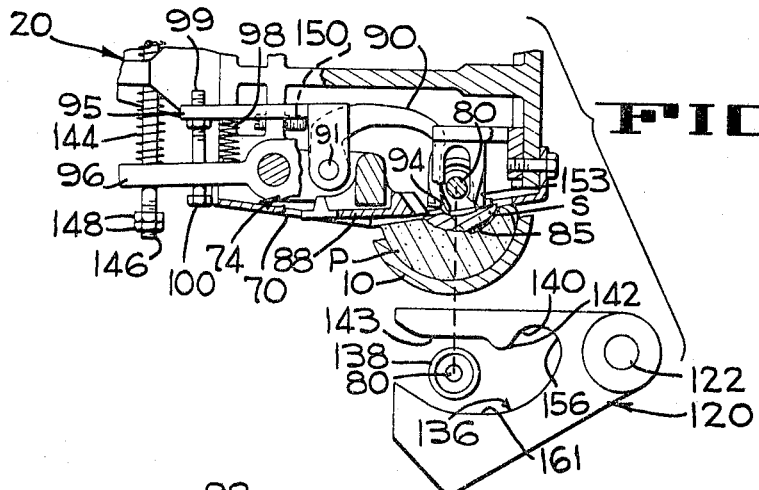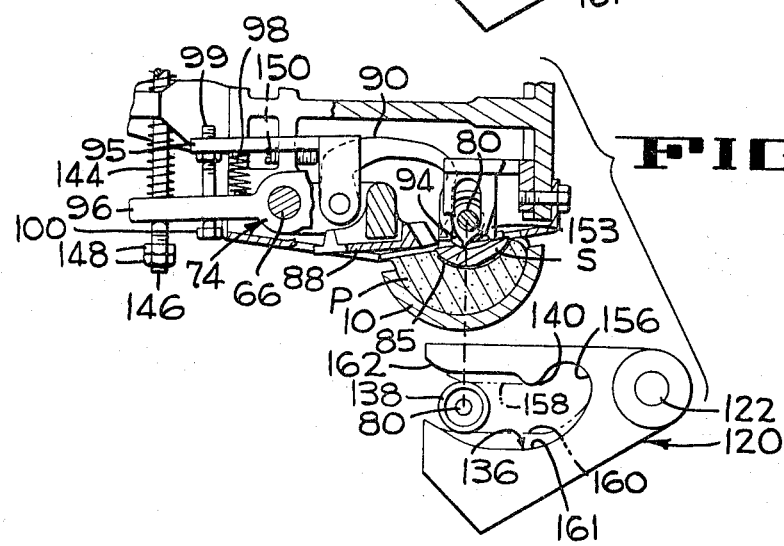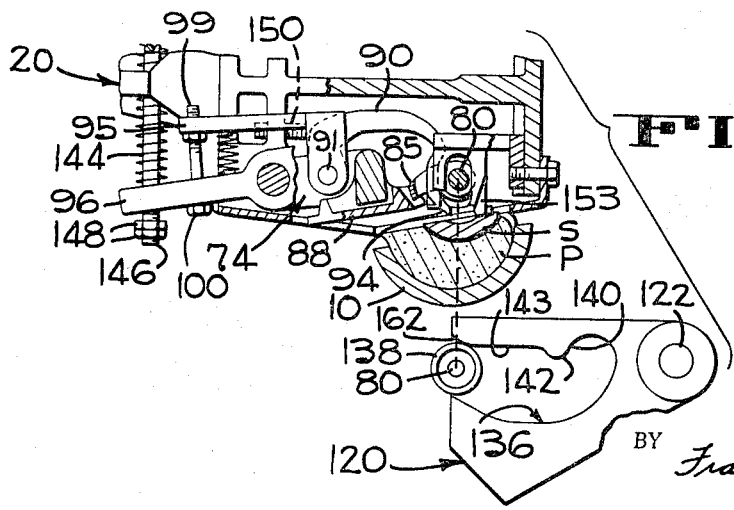

3,420,285
SELF-CONTOURING DRUPE PITTING HEAD
Gerald R. Anderson, Campbell, Calif., assignor to FMC Corporation, San Jose, Calif., a corporation of Delaware
Filed Jan. 23, 1967, Ser. No. 610,962
U.S. Cl. 146—28       5 Claims
Int. Cl. A23n 3/08

ABSTRACT OF THE DISCLOSURE

Peach halves are conveyed across a pitting head plate while the pitting head is moved with the peach. Head motion causes a loop knife to rotate for traversing the pit half and a control cam bodily advances the knife carrier for cutting. Thereafter contour cutting is accomplished by spring loading the knife with a contouring spring against the pit. The control cam is relieved so that after initial advance of the knife by the cam, the peach pit itself cams the knife out further, against the force of the contouring spring. A spring loaded pit restrainer always engages the pit cavity, even when the pits are quite thin.

BACKGROUND OF THE INVENTION

*Field of the invention.*—This is a peach stoner or pitter.

*Description of prior art.*—De Back et al. 2,581,785 shows a peach pitting head like that of the present invention in that the knife rotates on a carrier and the knife carrier is projected by a normally fixed knife control cam. This cam projects the knife out from the fruit support plate by a distance large enough to clear the largest radius pit, as the knife rotates. The control cam also controls retraction of the knife. A spring loaded, pit restrainer is mounted on the carrier, and the spring urges the restrainer against an adjustable depth gauge stop. The stop is adjusted to gauge the knife to cut a fixed distance outwardly from the inside bottom of the pit. With pits thinner than this setting, flesh is wasted because the control cam advances the pit restrainer and the knife carrier together. Also the pit restrainer setting must be changed for various radius pits. The term "pit restrainer" is a term of art; an important function of the device is to restrain pits against sliding during the cutting operation.

Since the knife carrier is cam controlled, there is no contouring action in the De Back design to account for deviation of the circular path of the knife from the oval contour of the pit.

In this type head, the knife does not back up the pit over the pit restrainer, during initial advance or projection of the knife from behind its plate. In some cases, as the control cam first advances the knife, the spring loaded pit restrainer pushes the pit away from the plate and places the pit so that it will be cut by the knife later in the knife stroke.

The pitting head of Vadas et al. 3,045,731 is an improvement over that of De Back et al., in that although the knife is initially projected by the knife control cam as before, the control cam is mechanically shifted inwardly (through a relief spring) during pitting, to compensate for the difference between the circular path of the knife and the oval pit contour, thereby increasing the yield. The pit restrainer is mounted as before. This device is subjected to pit dislodgement and pit cutting as in the De Back et al. device, when the control cam pulls the knife back in during mid-cut, it also pulls the pit restrainer back, releasing restraint on the pit.

Another problem with the Vadas et al. system is that the inertia of the knife and levers is too great for the knife to follow the pit at high speeds without the use of heavy springs. Pit breakage and pit remnants in the peach halves result.

SUMMARY OF THE INVENTION

The pitting head of the present invention is an improvement over both the De Back et al. and Vadas et al. devices relative to increased yield, and elimination of cut and broken pits. Because of an improvement in the knife control cam, the pit restrainer is no longer a gauge, and no longer need function to press the pit against the knife in the case of small radius pits, in order to optimize the yield. Hence, the pit restrainer need only serve the important function of preventing sliding of the peach pit along the support plate during pitting, and its projecting spring need now be just strong enough to hold the pit against sliding, and thus becomes purely a pit restrainer. Under the present invention, the pit restrainer does not shift or dislodge the pit into the path of the knife near the end of the cut. Since the pit restrainer spring is relatively weak, the pit restrainer stop can be set so that it just clears the knife, thus causing a restraining action on even the thinnest pits.

As indicated, the pitting head of the present invention also represents an improvement in the knife carrier projecting and retracting (control) cam. The corresponding cam in De Back et al. provides no contouring at all, whereas the cam of Vadas et al. is mechanically shifted (through a relief spring) to provide semi-contouring. The control cams of both prior devices advance the knife out from behind its plate by some maximum fixed distance corresponding to maximum pit radius, as explained. Although the Vadas et al. device later retracts the knife for contouring, the apparatus is insensitive. The combined effects of friction and inertia of these parts are such as to make the relief system substantially unresponsive in the short time available due to the pitting rates mentioned.

Under the present invention the knife control cam is normally stationary on the pitting head body. It need not be spring centered to accommodate oversize pits (De Back et al.), nor mechanically shifted through a relief spring for pseudo-contouring (Vadas et al.). The knife advance portion of the knife control cam is shortened, and it need only insure that the knife will clear the plate and just start up over the pit.

A functionally new spring is added, namely a contouring spring connected to the knife carrier to pull the knife against the pit for causing a self contouring cut. The control cam is relieved, to turn knife control over the contouring spring during cutting as well as to accommodate spring retraction of the knife and carrier. Thus, yield is optimized.

BRIEF DESCRIPTION OF THE DRAWINGS

FIGURE 1 is a plan view of a pitting machine showing the pitting head of the invention.

FIGURE 2 is a side elevation of the same, with a side plate broken away.

FIGURE 3 is an enlarged side elevation of the head, with parts broken away.

FIGURE 4 is a section taken on line 4—4 of FIG. 3.

FIGURES 5-10 are diagrammatic operational views.

DESCRIPTION OF THE PREFERRED EMBODIMENT

The improved pitting head of the present invention is particularly adapted for use with the pitting machine disclosed in U.S. Patent No. 2,376,526 to Albert R. Thompson, the construction and arrangement being such that the present pitting head 20 may be substituted for the head which was disclosed in said patented machine, without substantially altering the other parts of the machine.

Referring to FIGURES 1 and 2, feed cups 10 advance peach halves onto the head. The head 20 is mounted on a cradle 22 which is rotatable on a shaft 23 mounted in the machine frame. The cradle and the head are pivoted forwardly in the direction of arrow A (FIG. 2) during the pitting of a peach half, and are then swung rearwardly to the position illustrated, to receive a new peach half. The head 20 is oscillated by means of a cam 25 having a cam track 26 for a roller 27 rotatably mounted on an upper rear portion 30 of the cradle. The cam 25 is keyed to a shaft 32 that oscillates the head 20 in synchronism with feed cups 10 (FIG. 1), which cups are driven by the machine and are arranged to move the peach halves P and P′ and their pits s and s′ upwardly and forwardly along guide plates 36, and slide the halves onto opposite sides of the pitting head while the head is in its rearward position.

The head is mounted on the cradle 22 as follows:

A body portion 40 of the head (FIG. 4) has a central web 41, and an upper rear ear 42 (FIG. 1), secured between a pair of spaced bosses 43 on the cradle 22 by a bolt 44. The body portion 40 has two lower bosses 45 and 46 (FIG. 2) with positioning pins 50 that fit in sockets formed in the cradle. Thus, the pitting head 20 is removably connected by a three point support to the cradle 22.

At its forward end, the body portion of the head is provided with an arcuate track web 55 which has its center of curvature at shaft 23. The track 55 is guided by opposed rollers 56 supported by an overhead support bracket 57 mounted between side plates 58 and 59 (FIG. 1) of the machine.

The parts just described are like those in the prior mentioned patents. Additional details of the head structure common to this and prior devices will now be described.

The mechanism mounted on one side of the central web 41 is identical to the mechanism on the other side of the partition but oppositely disposed.

The body web 41 (FIGS. 3 and 4) of the head terminates in cross flanges 62 and 63, and in order to mount the knife carrier, the flange 63 has end bosses 64 that mount a knife carrier shaft 66. On each side of the head, a first support plate 70 is secured to the flanges 62 and 63. The knife carrier 74 is H-shaped and has two vertically spaced bosses 75 and 76 (FIG. 3) journalled for rotation on the body shaft 66. Each knife carrier 74 is mounted (FIG. 4) between the central web 41 and the corresponding fruit support plate 70. The fruit receiving end of each carrier 74 is drilled to receive a pitting knife shaft 80, and a loop knife 85 is secured to the shaft 80. The fruit support plate 70 is provided with an opening 86 (FIG. 4) for the knife. A shear plate 88 is mounted on the knife carrier 74 and the plate has a curved shearing edge 89 that closely fits the loop knife. As seen in FIGS. 7-9, when the knife carrier is advanced for pitting, the plate 88 is offset inwardly somewhat from the main fruit mount plate 70. The shear plate 88 helps prevent extrusion of the peach flesh into the opening 86, and also prevents pits from entering into the head cavities.

The pit restrainer 90 is mounted on the knife carrier 74 by a shaft 91 extending through the pit restrainer hub 92 (FIGS. 3 and 4). The pit restrainer has a curved arm 93 with a pointed tip portion 94 for engaging the pit opposite the knife shaft 80. The tip portion 94 is constructed in accordance with the application of Robert C. Luhdorff, Ser. No. 567,175, also assigned to the FMC Corporation. The pit restrainer lever 90 also has a combined stop and spring rest arm 95 (FIG. 4), which is offset upwardly (dotted lines in FIG. 3) to clear the knife carrier mounting boss 64. The pit restrainer arm 95 is spaced from a wing 96 (FIG. 4) formed on the knife carrier 74. A relatively light compression spring 98 is disposed between the pit restrainer arm 95 and the knife carrier wing 96, and thus urges the pit engaging end 94 outwardly. An adjustment bolt 99 is adjustably anchored in the pit restrainer arm 95 and passes freely through an opening in knife carrier wing 96 (FIG. 4), and the bolt head 100 forms a stop to limit projection of the pit restrainer tip 94 toward the knife 85 by the pit restrainer spring 98. Thus, the spacing between the path of movement of the pitting knife 85 and the pit restrainer point 94 may be adjusted (bolt 99) so that there will be a predetermined minimum clearance d (FIG. 4) between the pit restrainer tip 94 and the path of the knife 85.

The knife opening 86 in the support plate 70 is elongated to receive the shear plate 88 on the knife carrier 74, in such a manner that, when the carrier 74 is in its retracted position (FIG. 4) relatively close to the partition 41, the plate 88 is offset inwardly from the surface of the fruit support plate 70. When the knife carrier 74 is moved outwardly, the plate 88 moves to a position approximately flush with the normal surface of the fruit support plate, to form a peach half support or ramp, as well as to exclude pits from entering the body.

In order to operate the knife 85, each pitting knife shaft 80 projects upwardly from the head and carries a gear 102 (FIG. 1) keyed to the knife shaft 80 and meshed with an idler gear 104 rotatably journalled on a stub shaft 105 (FIG. 3) projecting up from the knife carrier 74. Each idler gear 104 meshes with a drive gear 106 rotatably supported on the body shaft 66, and the two drive gears 106 are in mesh, so that the two pitting knives operate simultaneously. One of the drive gears 106 is provided with a crank 108 (FIG. 1), connected by swivel linkage 110 to a pivot post 112 projecting up from the overhead support bracket 57. The several gears are so arranged that when the pitting head is moved forwardly in unison with the peach feed cups 10, the knife shafts 80 swing the pitting knives 85 outwardly through openings 86 to make arcuate cuts around the pit halves in the peach halves.

In machines of this type, each pitting knife must have been retracted to a position within the head, while a peach half is brought into position on the associated support plate 70, and the knife must be retracted again after the cut, to accommodate removal of the pitted peach half. The pit restrainer is also retracted at these stages of operation. Under the present invention, positive initial advance of the knife is provided by the control cam 120, but the latter is shaped to accommodate the self-contouring action of the knife during most of the cutting. The control cam 120 (FIG. 1) is mounted at 122 on a bridge 124, which bridge is pivotally mounted by bolts 126 between the side plates 58 and 59 of the machine. The bridge is U-shaped in plan and may be swung upwardly and away from the pitting head when it is desired to service the head. The bridge is retained in its lowered position by means of latch pins controlled by a hand operated lever 162, as shown in the De Back et al. patent.

Each control cam 120 is in the form of a substantially triangular plate pivotally supported at its rearward apex by a pivot pin 122, as mentioned. The pivotal mounting is only incidental to the invention, because normally the control cams 120 do not move. In the cam mounting shown, the cams can be forced outwardly when an extra large radius pit is encountered. The control cams are resiliently pressed against the heads 130 of stop bolts 132 adjustably secured in the bridge 124, and carrying springs 134 that engage the cams.

In order to advance and retract the knife carrier 74 and the knife, each control cam is provided with a cam slot 136 that overlies one of the pitting knife shafts 80 and receives a cam follower roller 138 (FIG. 1 and FIGS. 5-10) which is rotatably mounted on the upper end of the knife shaft.

Each cam slot 136 includes a knife advancing portion 140 (seen clear in FIGS. 8–10) terminating in a hump portion 142. As the follower roller 138 moves over the hump portion 142, the cam is relieved at 143 sufficiently to permit the knife to retract, unless the knife is held out by a pit. Each cam roller 138 is resiliently pressed toward the wall of the cam slot having the knife advancing hump 142 by a contouring spring 144, centered on a bolt 146 in the pitting head, the springs 144 being compressed between the body web 41 and the knife carrier wing 96 (FIG. 4). Nuts 148 serve as stops and determine the innermost position of the shear plate 88 and the knife.

This much of the machine, except for the relatively weak design of the pit restrainer springs 98, the mounting and mode of operation of the contouring springs 144, and the shape and function of the control cam slot 136, now to be described, in more detail, is like that of the patents previously mentioned. Also added to the machine of the present invention is a stop screw 150 (FIG. 4) which is mounted in a body flange 152 and which engages the pit restrainer 90. The set screw 150, acting through the pit restrainer stop bolt 99, limits the inward retraction of the knife carrier 74 by the spring 144. This function was performed by the control cam in the prior devices mentioned.

As in the aforesaid patents, a pit stop plate 153 is provided, although unlike the corresponding plate in the Vadas et al. patent, the pit stop plate of the present invention is screwed at 154 to the body. The pit stop plate 153 is offset inwardly from the surface of the fruit support plate 70 by 1/16 inch or so, in order to prevent pit halves from hanging upon the support plate.

The mode of operation of the embodiment of the invention just described and the manner in which the new and improved results previously referred to are obtained thereby will not be described with reference to the operation diagrams of FIGURES 5–10.

Each of FIGURES 5–10 is a composite figure on a somewhat reduced scale, comprising a horizontal section through one side of the fruit pitting head with the control cam 120, which is normally above the head, positioned to one side but in alignment therewith in the figures. The cup conveyor mechanism and other elements necessary to bring the peach up to the head and the mechanism for moving the head forward during the pitting operation are all omitted from these operational views. In these views, the control cam 120 is taken as a point of reference, and the pitting head 20 is advanced in increments from view to view to illustrate the operation of the device.

FIGURE 5 shows a peach half P and its pit halves after having been brought by cup 10 into position over the pit stop plate 152, just before when the head oscillating cam 25 (FIGURES 1 and 2) will start to advance the head 20 for the pitting action. The contouring spring 144 has retracted the knife 85 behind the pit support plate 70. The retracting action is limited by the follower roller 138 on the knife shaft 80, which is now bottomed in a recess 156 forming one end of the cam slot 136 of the control cam 120. The pit restrainer 90 is fully retracted to its pre-set position by the pit restrainer spring 98, which has brought the head 100 of the adjustment bolt 99 against the wing 96 of the knife carrier 74.

In FIGURE 6, the head, 20, has been advanced slightly by the cam 25 (FIGURES 1 and 2). The cam follower roller 138 has been forced out along the knife advancing portion 140 of the cam slot 136 in the control cam. This has brought the tip 94 of the pit restrainer against the inner side of the pit half s and the knife 85 has started to rotate and has been advanced so it is ready to pass through the opening in the peach support plate 70. The head 100 of the pit restrainer adjustment bolt 99 is held clear of the wing 96 on the knife carrier against the force of the pit restrainer advancing spring 98. The spring 98 now urges the tip 94 of the pit restrainer into retaining engagement with the pit half s with a force sufficient to locate the pit restrainer, but without mashing the pit into the peach half P, and without dislodging the pit during the cutting action that will follow.

In FIGURE 7, the head 20 has been advanced far enough on its forward stroke to bring the cam follower roller 138 onto the hump 142 in the slot of the control cam. The knife carrier 74 is now as fully advanced by the control cam 120 as it ever will be. The gearing and drive lever mechanism (FIGS. 1, 2) connected to cause the knife 85 to rotate has continued knife rotation sufficiently to initiate cutting of the pit flesh from the pit half. Control of the knife advance is still under the control cam 120 and has not been turned over to the contouring spring 144 up to this point.

In FIGURE 8, control of the knife has been turned over to the contouring spring 144 and automatic contouring of the knife 85 is in progress. The cam follower roller 138 is completely clear of the wall of the cam slot 136 and the knife 85 is being held against the peach pit surface of the contouring spring 134.

FIGURE 9 illustrates a critical stage in the operation in that it represents the position of the knife wherein the control cam provided positive retraction of the knife in prior devices. The shape of the prior control cams is shown in broken lines in this figure. The broken line 158 shows how the inner slot wall of the control cam of the present invention has been relieved to provide the spring contouring action just described. In the prior cams, the roller 138 would have been in engagement with the wall 158 of the cam slot, and would just be ready to slide down a ramp portion which accommodated retracting of the knife positively by the control cam.

Also shown in FIGURE 9 is a broken line 160 which shows how the outer wall of the cam slot of the control cam has been relieved in the present invention. The wall 160 cooperated with the wall 158 to positively guide the roller 138. The came relief outside of broken line 160 permits automatic adjustment for the radius of the pit half. Large radius pits merely compress the contouring spring 144 farther than small radius pits and cause the cam follower roller 138 to move out into the area between the broken line 160 and the actual outer wall 161 of the cam slot. The springs 134 which center the control cam do not function during normal operation and in fact can be dispensed with if desired. These springs only come into play in case of unusual circumstances, such as the case where extremely large pits cause the cam follower roller 138 to be forced against the outer wall 162 of the cam slot.

FIGURE 10 shows the head after the peach pit half has been completely cut free. The cam follower roller 138 is now spring urged against the cam slot portion 143 by the contouring spring 144. This has occurred after the knife 85 has been substantially completely rotated free of the pit half and the peach half. The pit restrainer tip is now free and is fully advanced by the pit restrainer spring 98 which brings the bolt head 100 of bolt 99 against the ring 96 of the knife carrier. Any further advance of the head would cause the cam follower roller to slide down a ramp portion 162 of the cam slot. This would free the knife carrier and the contouring spring 144 would bring the knife carrier against the set screw 150 and thus limit further retraction of the knife carrier assembly into the pitting head body, as previously described.

Thus, it can be seen that under the present invention, yield is optimized by providing an automatic self contouring cutting action. The pit restrainer spring 98 no longer serves as a depth gauge and has a spring rate which is less than that of the contouring spring 144. Thus, even though the knife does not back up the pit restrainer (see FIGURE 8) during all of the cutting operation, the pit restrainer spring is not strong enough to dislodge the pit and cause chopping of the pits during the terminal part of the cutting step.

Although the best mode contemplated for carrying out the present invention has been herein shown and described, it will be apparent that modification and variation may be made without departing from what is regarded to be the subject matter of the invention as set forth in the appended claims.

Having completed a detailed description of the invention so that those skilled in the art could practice the same, I claim:

1. In a pitting head of the type wherein the pitting knife carrier is mounted for advancing and retracting movement relative to a peach half supporting plate and for movement in an arcuate path for cutting, control means are provided for the knife carrier, and a pit restrainer is spring mounted on the knife carrier; the improvement which comprises contouring spring means connected to said knife carrier for resiliently urging said knife into engagement with the pit surface during a predetermined portion of said arcuate path, said control means being formed to free the knife carrier after initial advance of the knife and cause further advance of the knife away from the plate to be effected by the camming action of the peach pit itself, against the force of said contouring spring means.

2. The pitting head of claim 1, wherein said contouring spring means has a substantially higher spring rate than that of the pit restrainer for accommodating contour cutting without dislodgement of the pit by the pit restrainer.

3. A pitting head comprising a body having a fruit supporting plate means with an aperture formed therein, a knife carrier, means mounting said carrier on said body for accommodating lateral shifting of the carrier normal to said plate means, a loop like pitting knife rotatable on said carrier, means for rotating said knife through the aperture in said plate means, a pit restrainer aperture formed in said pit supporting plate means, a pit restrainer mounted on said knife carrier, and pit restrainer spring means for urging the pit restrainer out through the pit restrainer aperture; the improvement wherein contouring spring means is connected directly to said knife carrier for urging the knife inwardly against the pit surface during cutting.

4. A pitting head comprising a body having a fruit half supporting plate with an aperture formed therein, a pit supporting plate mounted within but clearing the wall of the aperture, a knife carrier, means mounting said carrier on said body for accommodating lateral shifting of the carrier normal to said plate, a loop like pitting knife rotatable on said carrier, means for rotating said knife through the aperture in said plate and about said pit supporting plate, control cam means connected between said knife carrier and said body for advancing said knife to start cutting, a pit restrainer aperture formed in said pit supporting plate, a pit restrainer mounted on said knife carrier, and pit restrainer spring means for urging the pit restrainer out through the pit restrainer aperture; the improvement wherein contouring spring means is connected between said body and said knife carrier for urging the knife inwardly against the pit surface during cutting, said control cam means being formed to free the knife carrier so that said contouring spring means holds the knife against the pit during cutting, after initial advance of the knife by said control cam means.

5. The pitting head of claim 4, wherein said contouring spring means has a higher spring rate than that of said pit restrainer spring means for providing automatic contouring motion of said knife carrier without causing said restrainer to dislodge the pit from said pit supporting plate.

References Cited
UNITED STATES PATENTS 3,045,731   7/1962   Vadas et al. _____ 146—28

JAMES M. MEISTER, *Primary Examiner.*